June 10, 1958 L. L. REPKO ET AL 2,838,036
VALVE ROTATING MEANS
Filed Oct. 22, 1956

L. L. REPKO.
CURTIS G. ASHLIN
INVENTORS.

BY E.C. McRae.
J. R. Faulkner.
T. H. Oster.
R. T. Seeger.
ATTY'S.

United States Patent Office 2,838,036
Patented June 10, 1958

2,838,036

VALVE ROTATING MEANS

Louis L. Repko, Detroit, and Curtis G. Ashlin, Wayne, Mich., assignors to Ford Motor Company, Dearborn, Mich., a corporation of Delaware Application October 22, 1956, Serial No. 617,440

7 Claims. (Cl. 123—90)

This invention pertains to a valve rotating means adapted for use with motor vehicle engine valves.

It is desirable in many instances to change the rotational position of an engine valve in its seat for more even heating and wear of the valve. This has been a recognized objective in engine design and while there are many devices attempting to accomplish this, they are usually ineffective as rotation is unpredictable or else the device is too complicated and expensive for practical use.

It is, therefore, an object of this invention to provide a valve rotater which while adding very little weight to the valve will rotate the valve a predetermined increment on each cycle of valve openings and closings.

This object is accomplished by the use of a skewed guide rod bolted or otherwise fixed to the engine block in close proximity to each valve desired to be rotated. A valve stem member such as the valve spring retainer is then slidably engaged with said rod so that upon reciprocation of the valve the retainer is caused to slide up and down the rod which imparts a swing cycle to theretainer turning it in one direction on valve opening and the opposite direction on valve closing. Due to the difference in resistance between the rocker arm or other member for actuating the valve on opening and closing of the valve the retainer will rotate the valve more when the valve is traveling in one direction than it will in the other, providing an incremental resultant in one direction on each swing cycle.

Figure 1:
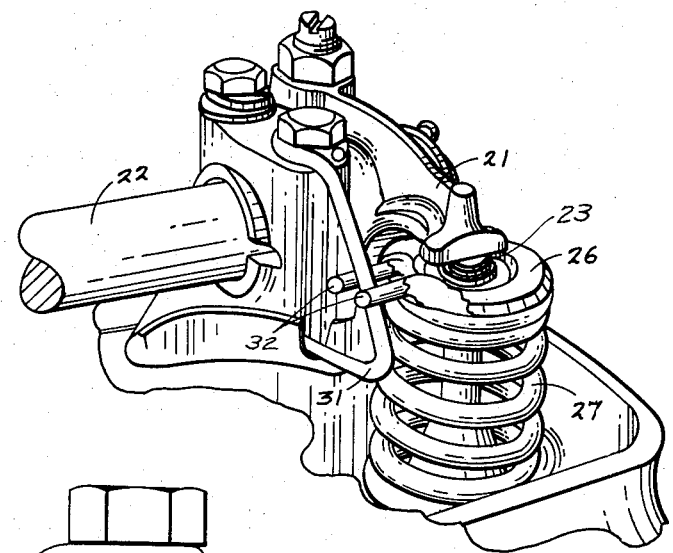
Figure 2:
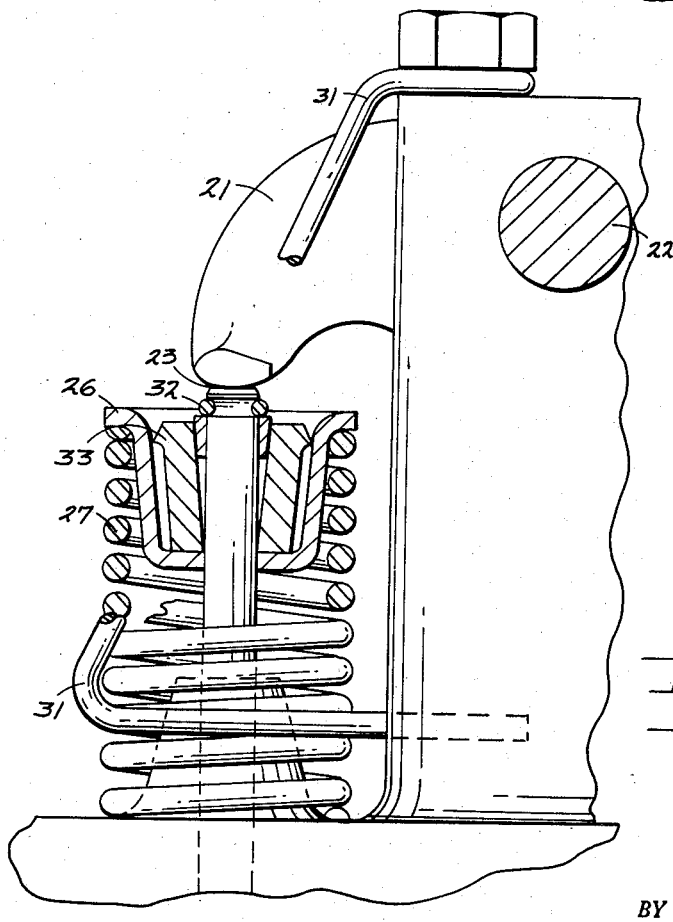

The objects and advantages of this invention will be better understood when a detailed description of one embodiment is read in which the following drawings are used for illustration:

Figure 1 is a pictorial view of the rocker arm, valve, retainer, guide rod and valve spring; and Figure 2 is an elevational partially cutaway view of the mechanism shown in Figure 1.

Looking at Figure 1 is seen rocker arm 21 which is raised and lowered by cam shaft 22 which depresses valve 23 along with spring retainer 26 and valve spring 27. Also shown is guide rod 31 which is included between the prongs of fork 32 which is welded or otherwise fixed to retainer 26. It may be seen that as rocker arm 21 depresses retainer 26, due to the sliding action of fork 32 along rod 31, an oscillatory swinging motion is imparted to the retainer.

In Figure 2 is shown a sectioned view with the specific relation between retainer 26 and valve 23 illustrated. Retainer 26 is urged upwardly against retainer sleeve 33 which is firmly attached to valve 23.

The operation of this embodiment is as follows: Rocker arm 21 depresses valve 23 and due to this pressure and frictional resistance therebetween along with the polar inertia of valve 23, rotation of the valve is retarded even though valve retainer 26 is being swung or rotated by virtue of fork 32 sliding along rod 31. However, on the upstroke of the rocker arm 21 and valve 23 the frictional resistance therebetween is not quite so large and when retainer 26 is swung in the opposite direction owing to the reverse travel of fork 32 along rod 31 retainer sleeve 33, and hence valve 23, is turned a substantially greater amount than it is in the downstroke. Hence each opening and closing cycle of the valve is accompanied by an incremental rotation of the valve in the direction of the retainer on the upstroke.

It will be understood that the invention is not to be limited to the exact construction shown and described, but that various changes and modifications may be made without departing from the spirit and scope of the invention, as defined in the appended claims.

What is claimed is:

1. In a reciprocable valve assembly having a valve actuated by a rocker arm against the pressure of a spring that improvement comprising a guide rod being skewed relative said valve stem, a spring retainer being slidingly attached to said rod so that on reciprocation of said valve said retainer will be caused to swing in equal arcs on the opening and closing strokes of said valve, so that said retainer uniformly turns said valve on one of said opening and closing strokes more than on the other thereby imparting a substantially uniform incremental resultant rotation of said valve on a cycle of opening and closing strokes.

2. The assembly of claim 1 where the frictional resistance between said rocker arm and said valve will keep said valve from being turned by said retainer more than on the closing stroke thereby turning said valve a uniform increment in the direction of said retainer on said closing stroke.

3. A valve rotating mechanism comprising a valve stem, a valve spring retainer received on said stem and frictionally rotatable therewith, a valve spring received in said retainer, a guide rod laterally positioned with respect to said stem, a pair of spaced rods engageable with said guide rod throughout the movement of said valve stem and fixed to said retainer whereby rotational movement is imparted to said retainer upon movement of said stem.

4. An internal combustion engine valve rotator comprising a guide bar fixed to a cylinder head at an acute angle to the longitudinal axis of the valve stem to be rotated, and slide means engageable with said guide bar fixed to the valve spring retainer.

5. An internal combustion engine valve mechanism comprising a cylinder head, a poppet valve having a valve stem slidably mounted in said head, a valve spring retainer rotatably received on said stem, a valve spring coaxial with said stem and received by said retainer, a guide fixed to said head and forming an acute angle to the longitudinal axis of said stem, said retainer having means slidably engaged with said guide whereby a swing motion is imparted to said retainer upon reciprocal motion of said stem.

6. A mechanism for rotating a laterally and rotatably movable valve stem comprising a stem-driving portion frictionally carried by said stem, and means to cause said portion to rotate through a fixed arc upon longitudinal stem movement in one direction and to return through said arc upon return longitudinal movement of said stem with sufficient acceleration to cause slippage between said portion and said stem.

7. The method of imparting incremental valve rotation to an internal combustion engine poppet valve having a spring retainer frictionally rotatable on said valve of driving said retainer through a cycle of oscillatory rotational motion in synchrony with each cycle of longitudinal valve motion, said oscillatory motion having an acceleration sufficient to cause slippage between the valve and the retainer during at least a portion of said motion.

References Cited in the file of this patent

UNITED STATES PATENTS

| | | |
|---|---|---|
| 2,589,418 | Mitzelfeld et al. | Mar. 18, 1952 |
| 2,742,029 | Burrell | Apr. 17, 1956 |

FOREIGN PATENTS

| | | |
|---|---|---|
| 562,884 | France | Nov. 21, 1923 |